US010265593B2

(12) United States Patent
Froemming

(10) Patent No.: US 10,265,593 B2
(45) Date of Patent: Apr. 23, 2019

(54) POWER-ASSISTED GROUND HOLE CUTTER

(71) Applicant: Kevin Froemming, Hutchinson, MN (US)

(72) Inventor: Kevin Froemming, Hutchinson, MN (US)

(73) Assignee: Kevin Froemming, Hutchinson, MN (US)

( * ) Notice: Subject to any disclaimer, the term of this patent is extended or adjusted under 35 U.S.C. 154(b) by 0 days.

(21) Appl. No.: 15/615,622

(22) Filed: Jun. 6, 2017

(65) Prior Publication Data

US 2017/0356262 A1    Dec. 14, 2017

Related U.S. Application Data

(60) Provisional application No. 62/348,232, filed on Jun. 10, 2016.

(51) Int. Cl.
| | |
|---|---|
| *A63B 57/30* | (2015.01) |
| *E21B 7/02* | (2006.01) |
| *A63B 57/40* | (2015.01) |
| *A01G 20/12* | (2018.01) |

(52) U.S. Cl.
CPC ............ *A63B 57/357* (2015.10); *A63B 57/40* (2015.10); *E21B 7/027* (2013.01); *A01G 20/12* (2018.02)

(58) Field of Classification Search
CPC . E21B 7/02; E21B 7/027; E21B 7/028; A63B 57/357
USPC ..................................................... 172/21, 22
See application file for complete search history.

(56) References Cited

U.S. PATENT DOCUMENTS

| | | | | |
|---|---|---|---|---|
| 3,817,337 A | * | 6/1974 | Panak .................... | A01B 45/00 172/22 |
| 4,763,735 A | * | 8/1988 | Gay ....................... | E01C 23/094 172/21 |
| 4,836,294 A | * | 6/1989 | Bencriscutto ............ | E02F 3/06 172/111 |
| 4,947,938 A | * | 8/1990 | Fricke .................... | A01B 45/00 172/22 |
| 4,958,688 A | * | 9/1990 | Marrow ................... | A01C 5/04 172/22 |

(Continued)

OTHER PUBLICATIONS

"FSH machines aps", retrieved at <https://web.archive.org/web/20151214122800/http://fshmachines.com/ecutter.html>, retrieved on Sep. 26, 2017, 5 pages.

(Continued)

*Primary Examiner* — Matthew D. Troutman
(74) *Attorney, Agent, or Firm* — Wesley W. Malherek; Kelly, Holt & Christenson PLLC

(57) ABSTRACT

A ground hold cutter includes a mechanical actuator, a housing shaft, and an arm housed within the housing shaft and coupled to the mechanical actuator. The arm is configured to extend and retract relative to the housing shaft. The ground hole cutter further includes a cylindrical cutter coupled to the arm and configured to engage a ground surface. In addition, the ground hole cutter includes a power supply and a controller. The controller is coupled to the power supply, and configured to control extension and retraction of the arm by actuating the mechanical actuator such that the extension and retraction of the arm engages the cutting component to cut a hole in the ground surface.

20 Claims, 16 Drawing Sheets

(56) References Cited

U.S. PATENT DOCUMENTS

| | | | | |
|---|---|---|---|---|
| 5,337,831 A | * | 8/1994 | Chopp | E21B 25/00 |
| | | | | 172/22 |
| 5,542,476 A | * | 8/1996 | Hansen | E21B 3/025 |
| | | | | 166/240 |
| 2006/0169467 A1 | * | 8/2006 | Hansen | A01B 45/00 |
| | | | | 172/22 |

OTHER PUBLICATIONS

R&A Rules of Golf Limited and the United States Golf Association, "Rules of Golf and the Rules of Amateur Status—33rd Edition, Effective Jan. 2016", Published Oct. 2015.

* cited by examiner

POWER-ASSISTED GROUND HOLE CUTTER

The present application is based on and claims the benefit of U.S. provisional patent application Ser. No. 62/348,232, filed on Jun. 10, 2016, the contents of which is hereby incorporated by reference in its entirety.

BACKGROUND

The present disclosure generally relates to implements that engage a ground surface to form a hole.

There are a wide variety of golf course designs. Courses range from world-renowned and meticulously cared for facilities to the more common public institutions. Golf courses consist of a number of holes arranged in a certain progression. Leading up to each hole, as the player attempts to hit the ball into the hole, the player will progress from a taking shots near a tee box, to near a fairway, to near a putting green.

Golf is a highly competitive and highly skilled game. Courses are designed to have different slopes, grades, thicknesses of grass, wind speeds, etc. to challenge players. Groundskeepers may be tasked with altering these traits of the course, for example, to prepare for a tournament, reduce course wear at certain parts, etc. For instance, changing mowing patterns and the length of grass, moving sand traps, changing the direction of player progression along the holes, moving the individual holes to different positions on the green, etc., are examples of course traits that can be altered.

The putting green (hereinafter—"the green") is a portion of a golf course near the end of the fairway that typically has a surface of finely trimmed grass. At some position on the green, a hole is formed. The hole often retains a cup or insert, and the players attempt to hit the golf ball into the cup. At least in accordance with rules of the United States Golf Association (USGA "Rules of Golf" effective January 2016), the hole (with or without the insert) has a diameter of 108 millimeters (4.25 in) and a depth of at least 10 centimeters (3.94). The green is well known as a particularly challenging portion of the course, as it forces the game to be played on a minute scale.

The discussion above is merely provided for general background information and is not intended to be used as an aid in determining the scope of the claimed subject matter.

SUMMARY

A ground hole cutter is presented. The ground hold cutter includes a mechanical actuator, a housing shaft, and an arm housed within the housing shaft and coupled to the mechanical actuator. The arm is configured to extend and retract relative to the housing shaft. The ground hole cutter further includes a cylindrical cutter coupled to the arm and configured to engage a ground surface. In addition, the ground hole cutter includes a power supply and a controller. The controller is coupled to the power supply, and configured to control extension and retraction of the arm by actuating the mechanical actuator such that the extension and retraction of the arm engages the cutting component to cut a hole in the ground surface.

This Summary is not intended to identify either key features or essential features of the claimed subject matter, nor is it intended to be used as an aid in determining the scope of the claimed subject matter. Further, the claimed subject matter is not limited to implementations that solve any or all disadvantages noted in the background.

BRIEF DESCRIPTION OF THE DRAWINGS

FIG. 1-3 illustratively shows a block diagram of a ground hole cutter, in accordance with one embodiment.

FIG. 2-1 illustratively shows perspective view of a cylindrical cutter, in accordance with one embodiment.

FIG. 2-2 illustratively shows a partial cutaway view of a cylindrical cutter having a plug actuator plate disposed therein, in accordance with one embodiment.

FIG. 2-3 illustratively shows a partial cutaway view of a cylindrical cutter having a plug actuator at a plug ejection position, in accordance with one embodiment.

FIG. 3 illustratively shows a perspective view of a coupling mechanism of a ground hole cutter, in accordance with one embodiment.

FIGS. 5-1 illustratively shows a perspective view of a ground hole cutter in a retracted position during operation to engage a ground surface in cutting a hole, in accordance with one embodiment.

FIG. 5-2 illustratively shows a perspective view of a ground hole cutter in an extended position during operation to engage a ground surface in cutting a hole, in accordance with one embodiment.

FIG. 5-3 illustratively shows a perspective view of a ground hole cutter in a transportation position during operation to retain a plug of a formed hole, in accordance with one embodiment.

FIG. 5-4 illustratively shows a perspective view of a ground hole cutter in a plug ejection position during operation to plug a ground hole, in accordance with one embodiment.

FIG. 6-1 illustratively shows a perspective view of a power-assisted cylindrical cutter, in accordance with one embodiment.

FIG. 6-2 illustratively shows a perspective view of a yoke mechanism for a power-assisted cylindrical cutter, in accordance with one embodiment.

DETAILED DESCRIPTION OF ILLUSTRATIVE EMBODIMENTS

On some courses, the green is the portion of the course that is altered most frequently to both challenge players and facilitate maintaining the quality of the green. Sometimes the position of a hole for a particular green is changed daily, and sometimes the position is changed multiple times per day. Over the course of a year, hole positions may be formed and re-formed hundreds of times per green, and courses often include 18 or more greens.

In addition to the quantity of work required to alter the green or course, as mentioned above, many courses demand a quality of the green that can be difficult to achieve. For instance, greens are highly sensitive to pressure, weather, temperature, and other factors that affect the grass and/or supporting ground. As such, they require an elevated level of attention to detail and caution when installing fixtures and performing maintenance, such as forming and re-forming holes. However, traditional devices do not adequately address these challenges.

Figure 1:
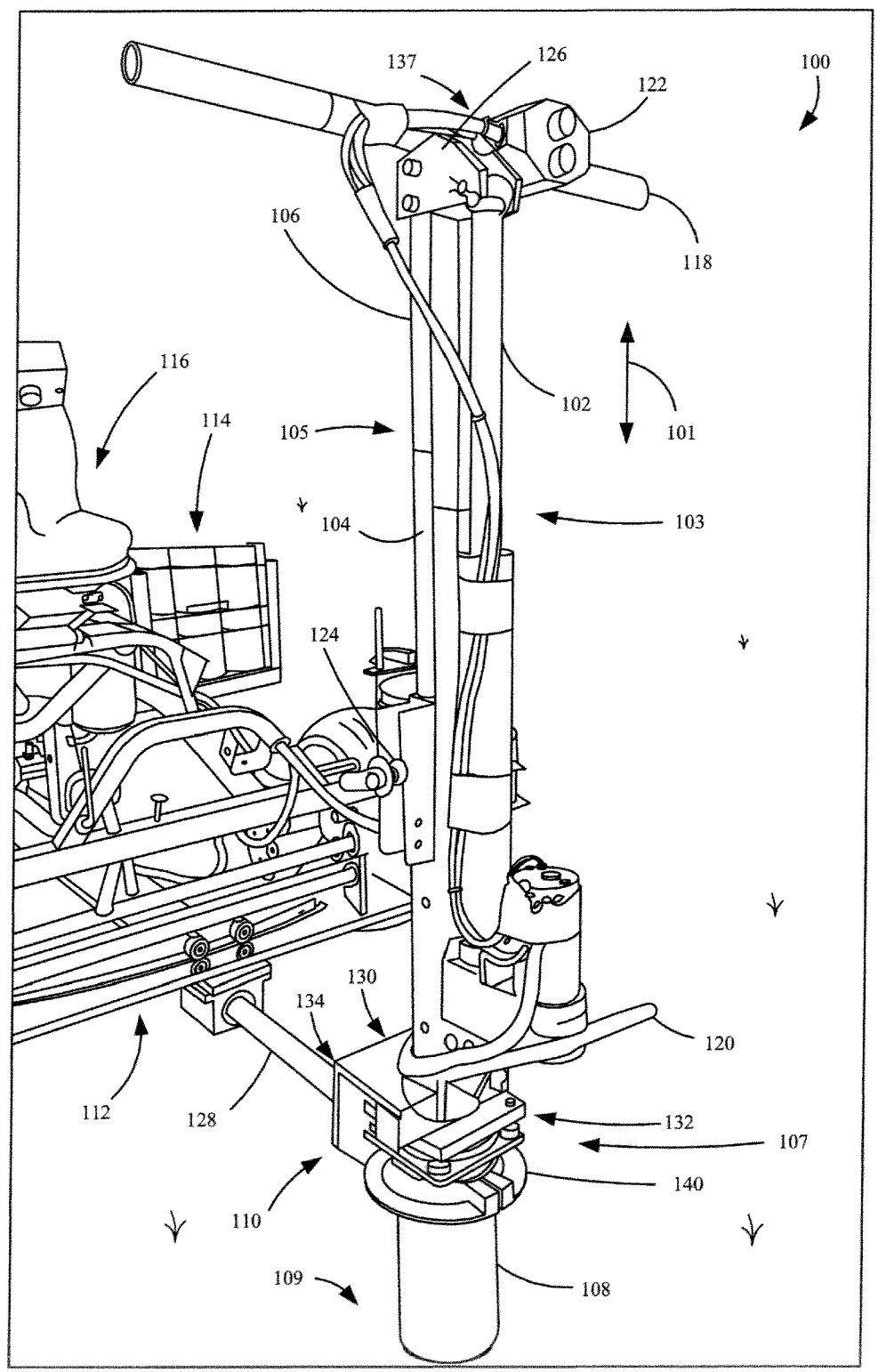
FIGS. 1-1 and 1-2 illustratively show a perspective view of a ground hole cutter, in accordance with on embodiment.
Figures 1, 2:
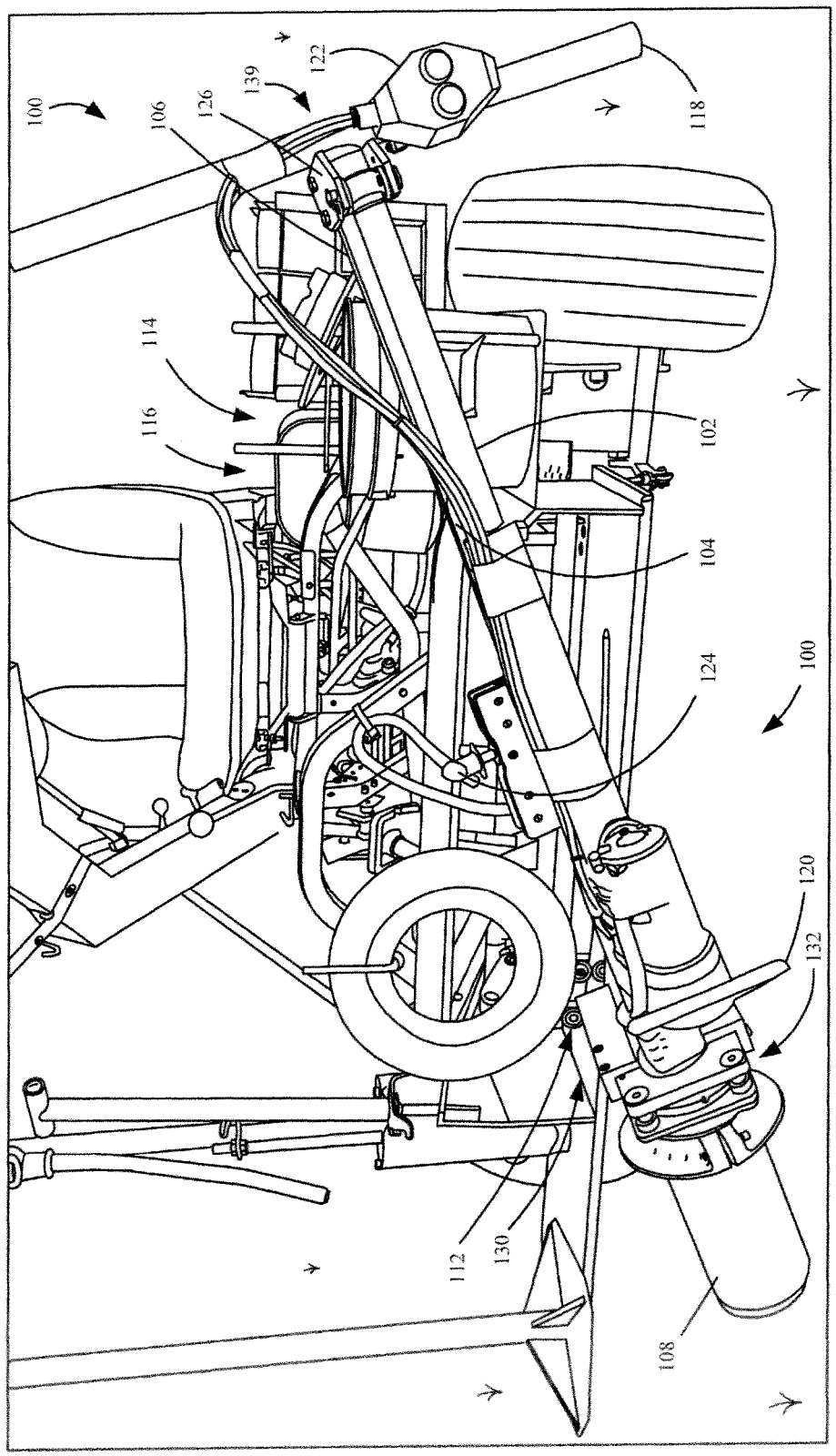
Figures 1, 2, 3:
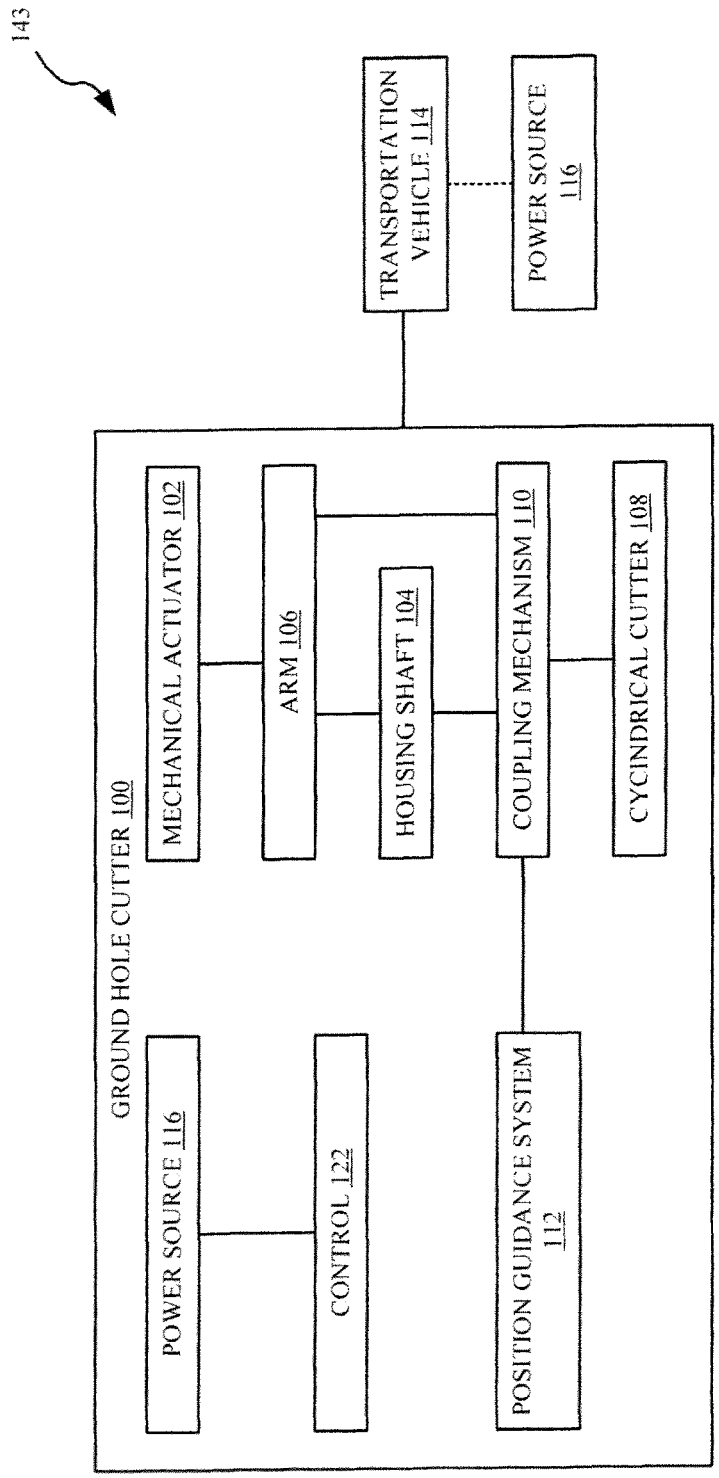
Figures 1, 2:
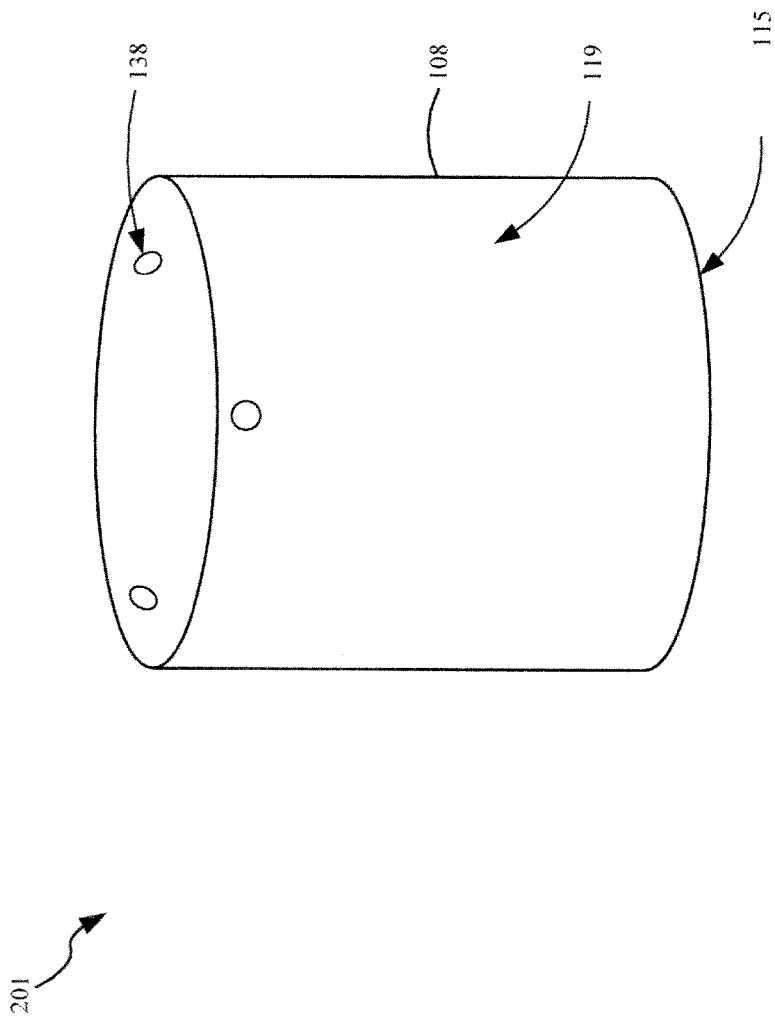
Figure 2:
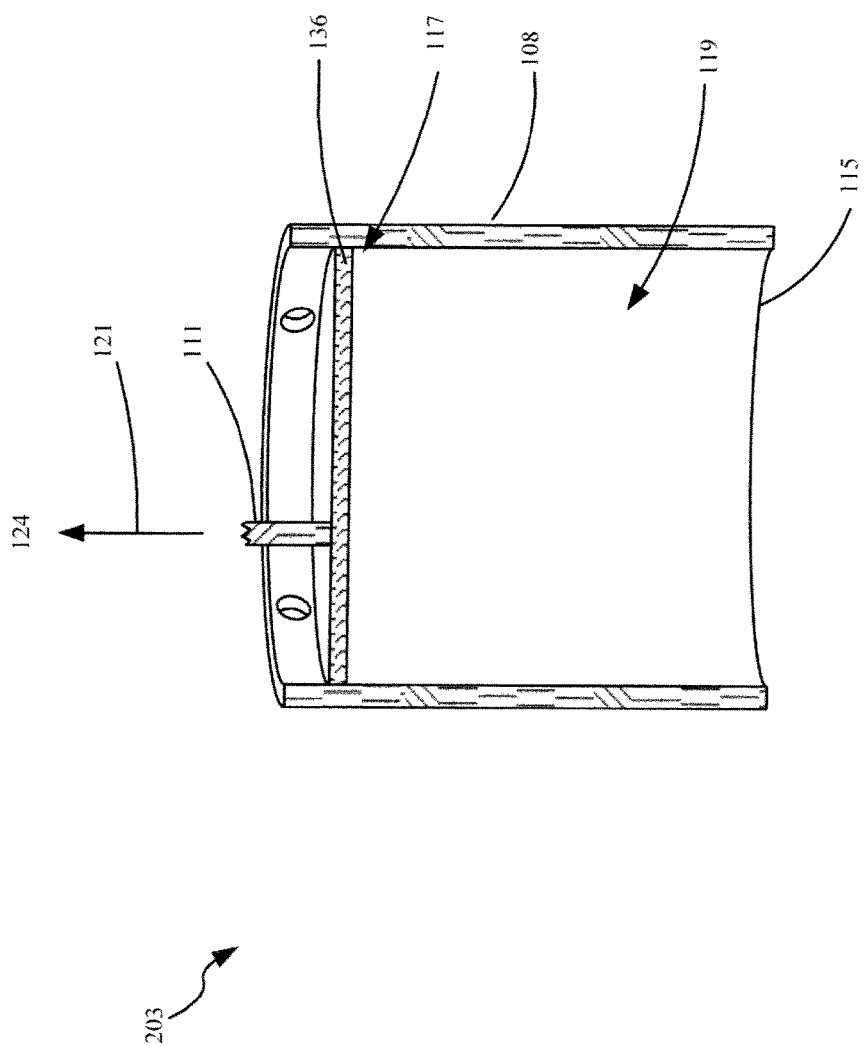
Figures 2, 3:
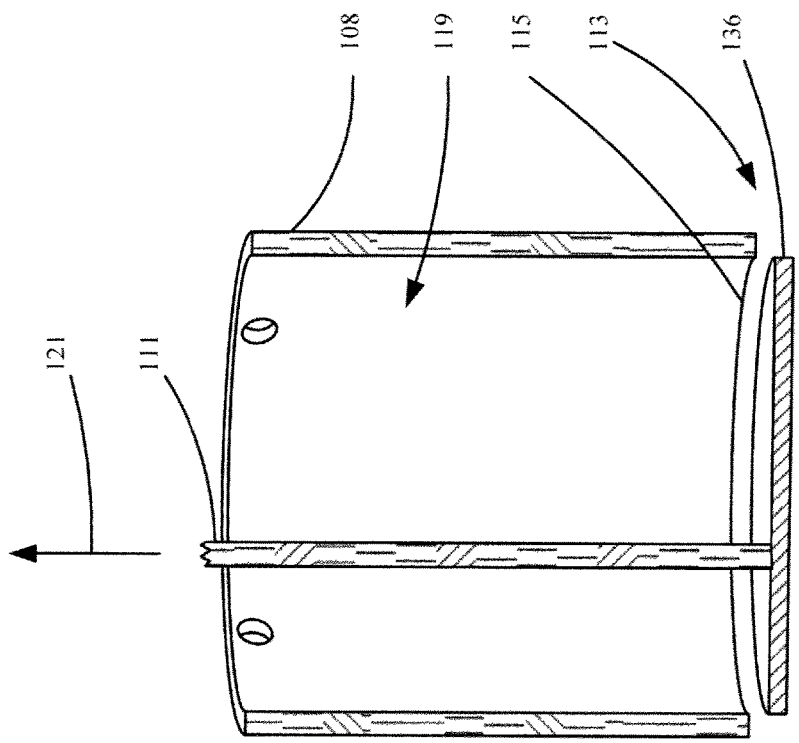
Figure 3:
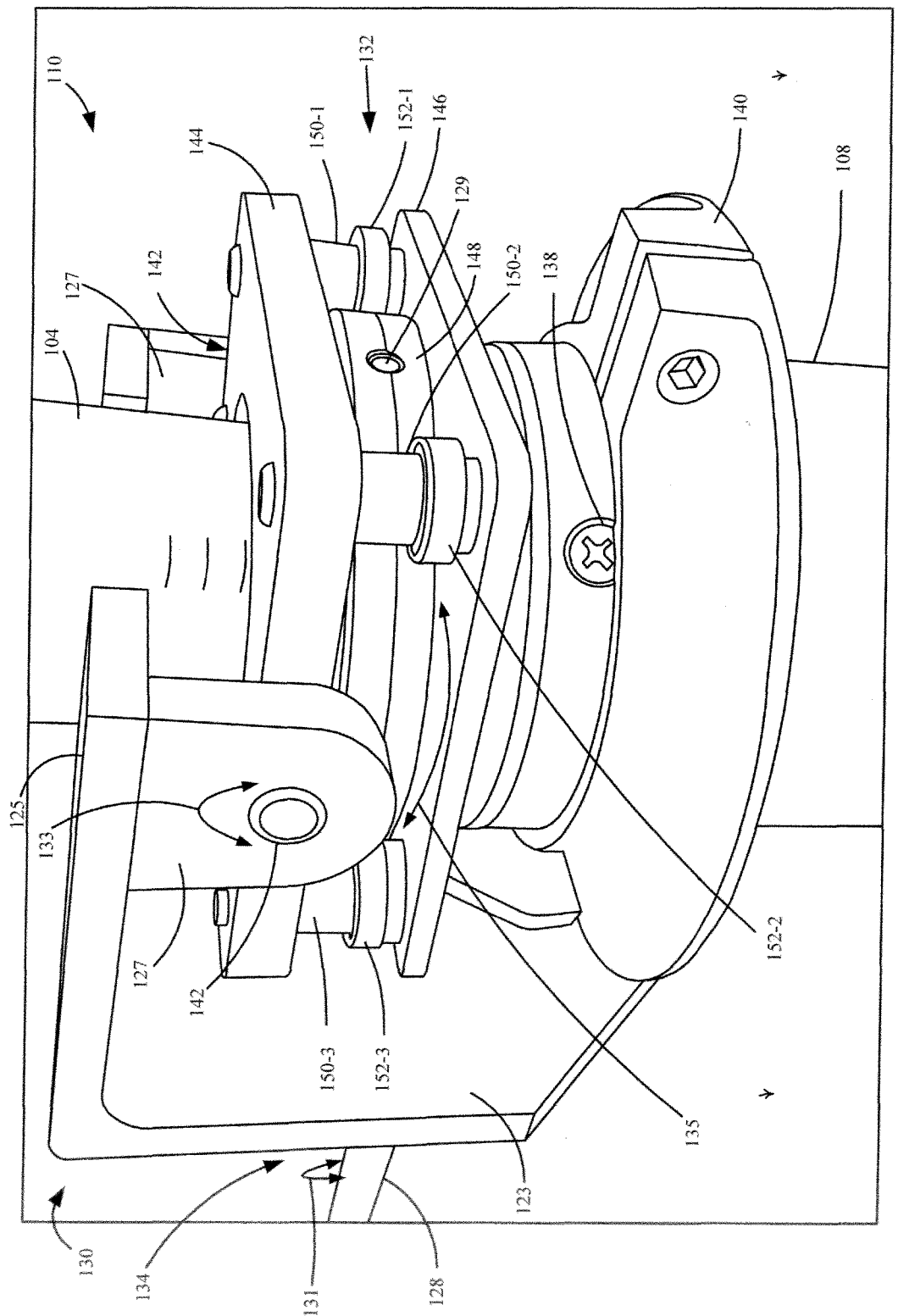

FIGS. 1-1 and 1-2 illustratively show a perspective view of a ground hole cutter 100, in accordance with one embodiment. FIG. 1-3 illustratively shows a block diagram 143 of ground hole cutter 100, in accordance with one embodiment. FIGS. 1-1, 1-2, and 1-3 are collectively referred to herein as FIG. 1. FIG. 1 (collectively) will now be described in further detail below.

Ground hole cutter 100 generally includes a power-assisted hole cutting implement that cuts and plugs holes in a ground surface such as that of a golf course. The term "hole," as used herein, primarily refers to a hole formed in a ground surface of a putting green, particularly a hole defined by dimensions of 4.25 inches (108 millimeters) in diameter and at least 4 inches (101.6 millimeters) deep. Of course, the term "hole," as used herein, can also refer to any of a number of different holes having different dimensions.

Ground hole cutter 100 illustratively includes a mechanical actuator 102, a housing shaft 104, an arm 106, a cylindrical cutter 108, a coupling mechanism 110, a position guidance system 112, a transportation vehicle 114, a power source 116, a first handle 118, a second handle 120, a control 122, a plug actuator 124, a bracket 126, and a hole depth flange 140. Coupling mechanism 110 illustratively includes a first assembly 130, a second assembly 132, and a coupling point 134. Position guidance system 112 illustratively includes rod 128.

First handle 118 and second handle 120 are configured to allow an operator to grip ground hole cutter 100 and facilitate movement of ground hole cutter 100 to a desired position. Thus, ground hole cutter 100 is configured to be engaged, by an operator, at one or more of first handle 118 and second handle 120.

In the illustrated example, mechanical actuator 102 is a hydraulic actuator that extends and retracts in the direction generally indicated by arrow 101. Mechanical actuator 102 can include any of a wide variety of different hydraulic actuators having various pressure ratings. In one embodiment, mechanical actuator 102 has a pressure rating of 1,000 pounds. For the purposes of discussion only, and not by limitation, mechanical actuator 102 thus includes any actuator that can generate motion, particularly motion that extends and retracts mechanical actuator 102 along a plane, such as along the uniform direction of arrow 101. Mechanical actuator 102 is generally configured to purport the generated motion to arm 106.

Mechanical actuator 102 is illustratively coupled to arm 106 via bracket 126. Bracket 126 includes any coupling mechanism that fastens mechanical actuator 102 to arm 106. As such, bracket 126 facilitates maintaining uniform movement between mechanical actuator 102 and arm 106. During operation, for instance, extension and retraction of mechanical actuator 102 is transferred to arm 106.

Arm 106 is illustratively configured to be housed within housing shaft 104. In one example, housing shaft 104 is configured to retain at least a portion of arm 106 such that arm 106 can be extended with respect to housing shaft 104. For instance, arm 106 is a rectangular block having dimensions slightly smaller than that of housing shaft 104. Housing shaft 104 is a hollow block that receives the insertion of arm 106 directly and/or via a slidable arrangement, such as one or more bearings. Housing shaft 104 illustratively includes two openings, a first opening 105 and a second opening 107 (e.g. at an end of housing shaft 104 that is distal to that of first opening 105). Arm 106 is configured to extend beyond first opening 105 and second opening 107.

As shown in FIG. 1-1, ground hole cutter 100 is in a first position 103. In first position 103, it can be seen that mechanical actuator 102 is fully extended, which results in arm 106 being pushed upwards. At least a portion of arm 106 is shown as being extended past first opening 105. As will be discussed in further detail below, ground hole cutter 100 can also be moved to a second position (not shown in FIG. 1) such that mechanical actuator 102 is fully retracted, thereby causing arm 106 to be extended beyond second opening 107 of housing shaft 104.

In the illustrated example of FIG. 1, arm 106 is coupled to cylindrical cutter 108 at or near the position of second opening 107. Arm 106 is configured to transfer motion, in the direction generally indicated by arrow 101, to cylindrical cutter 108. In one example, first position 103 configures cylindrical cutter 108 to be in a retracted position. For instance, arm 106 is not extended beyond second opening 107, but is rather extended beyond first opening 105. In first position 103, cylindrical cutter 108 is positioned above a ground surface shown at reference numeral 109. Thus, first position 103 includes a retracted position of cylindrical cutter 108. Accordingly, the above-mentioned second position of ground hole cutter 100 includes a position in which mechanical actuator 102 is fully retracted, arm 106 is extended beyond second opening 107, and cylindrical cutter 108 is extended towards a ground surface 109. Cylindrical cutter 108 is configured to be extended, via arm 106, into a ground surface 109.

Control 122 is generally configured to control operation of mechanical actuator 102, and thus the engagement of cylindrical cutter 108 with a ground surface. Control 122 can include any of a wide variety of different control mechanisms such as, but not limited to, processors, microprocessors, other integrated circuitry, etc. An interface to control 122 (as shown in FIG. 1 at reference numeral 122) illustratively includes one or more buttons that are actuable by an operator or user. For instance, control 122 can include an extension and a retraction button, each of which is actuated to extend or retract mechanical actuator 102, respectively.

Ground hole cutter 100 is illustratively attached to transportation vehicle 114. Transportation vehicle 114 includes any of a wide variety of different vehicles that are powered or non-powered. Particularly, transportation vehicle 114 can include a vehicle configured for use in performing facility maintenance operations, such as maintaining a golf course. In the illustrated example, transportation vehicle 114 is a powered lawn mower, such as a mower for maintaining a golf course. Ground hole cutter 100 can therefore be easily transported to any desired location. Especially in situations where an operator is required to cut multiple holes at various locations on a golf course, ground hole cutter 100 can be easily moved to those locations.

Power source 116 includes any of a wide variety of different power sources that can provide power to ground hole cutter 100 and/or transportation vehicle 114. In the illustrated example, power source 116 is a gasoline powered combustion engine. In addition, or alternatively, power source 116 includes one or more batteries that provide electricity to power ground hole cutter 100 and/or transportation vehicle 114. In one embodiment, power source 116 is separate from a power source that powers transportation vehicle 114.

FIG. 2-1 illustratively shows a perspective view 201 of a cylindrical cutter 108. Cylindrical cutter 108 is a cylindrical vessel that includes an opening 115, an interior space 119, and coupling point shown generally at reference numeral 138. Coupling point 138 is configured to couple cylindrical cutter 108 to a portion of ground hole cutter 100 such as, but not limited to, arm 106 and/or housing shaft 104. However, while one coupling point 138 is illustrated, other embodiments comprise multiple coupling points 138. Opening 115 defines an edge of interior space 119 of cylindrical cutter 108 and is configured to cut a ground surface. For instance, edge of opening 115 is forced into a ground surface when cylindrical cutter 108 is extended by arm 106 via mechanical actuator 102.

FIG. 2-2 illustratively shows a partial cutaway view 203 of cylindrical cutter 108 having a plug actuator plate 136 disposed therein, in accordance with one embodiment. It is illustratively shown in FIG. 2-2 that plug actuator plate 136 is disposed within interior space 119 at a first plug position generally indicated at reference numeral 117. Plug actuator plate 136 is coupled to a plug actuator connection rod 111. Plug actuator connection rod 111 illustratively extends past the view shown at 201 and couples to plug actuator 124, as generally indicated by arrow 121. Plug actuator plate 136 is generally configured to be moved along interior space 119 to various positions. The various positions correspond to, in operation, the retention or ejection of a ground plug from within interior space 119. A plug retention position 117 defines a position at which plug actuator plate 136 does not eject a plug out of interior space 119. For instance, when forming a new hole, opening 115 cuts a ground plug and the plug is retained in interior space 119, as defined by plug retention position 117.

Once a new hole is formed, it is often desirable to remove the ground plug from within interior space 119 to allow for additional hole forming or, for example, to fill in a previously formed hole with the plug (as discussed in further detail below with respect to FIG. 6-4). Plug actuator 124 and cylindrical cutter 108 are configured to provide a mechanism by which an operator can easily eject the plug.

FIG. 2-3 illustratively shows a partial cutaway view 205 of a cylindrical cutter 108 having a plug actuator plate 136 at a plug ejection position generally indicated at reference numeral 113, in accordance with one embodiment. The plug can be ejected out from within interior space 119 by actuating plug actuator 124 (e.g., illustrated in FIG. 1) such that plug actuator plate 136 is moved towards opening 115. In one embodiment, plug actuator plate 136 is configured to be extend past opening 115. As shown in FIG. 2-2, plug actuator plate 136 is positioned at a plug ejection position 113, which corresponds to plug actuator connection rod 111 being fully extended, and thereby extending plug actuator plate past opening 115 of cylindrical cutter 108. For instance, plug ejection position 113 is indicative of a position of plug actuator plate 136 after an operator has actuated plug actuator 124 to move plug actuator connection rod 111 towards opening 115 to eject the ground plug from out of interior space 119.

FIG. 1 illustratively shows that ground hole cutter 100 is coupled to position guidance system 112 at coupling mechanism 110. Briefly, it is shown that position guidance system 112 further forms a coupling point between coupling mechanism 110 and transportation vehicle 114, thereby providing a mechanism for mounting ground hole cutter 100 to transportation vehicle 114. Prior to discussing position guidance system 112 in further detail, a detailed discussion of coupling mechanism 110 is provided below.

FIG. 3 illustratively shows a perspective view of a coupling mechanism 110 of a ground hole cutter 100, in accordance with one embodiment. Coupling mechanism 110 illustratively includes a first assembly 130 and a second assembly 132. First assembly 130 illustratively includes a first surface 123, a second surface 125, second assembly attachment arms 127, and pivotable coupling points 142. Second assembly 132 illustratively includes a first plate 144, a second plate 146, a housing shaft engagement ring 148, one or more posts shown generally at reference numeral 150 (e.g., posts 150-1, 150-2, 150-3, and one or more bearings shown generally at reference numeral 152 (e.g., 152-1, 152-2, 152-3,).

In the illustrated example, first surface 123 extends towards cylindrical cutter 108 and is parallel to housing shaft 104. First surface 123 provides a surface for coupling to rod 128 at coupling point 134. Coupling point 134 can include a wide variety of different connecting mechanisms that couple rod 128 to first surface 123. For instance, coupling point 134 includes a receiving portion of first surface 123 that rotatably engages rod 128. Coupling point 134 is configured to allow first assembly 130 to rotate along the direction generally indicated by arrow 131. Regardless of the type of coupling mechanism included in coupling point 134, first surface 123 is configured to attach rod 128 (and thus position guidance system 112) to first assembly 130 (and thus to coupling mechanism 110, as discussed below) and allow for rotation of ground hole cutter 100 along the direction indicated by 131.

First assembly 130 further illustratively includes a second surface 125 that extends perpendicular to housing shaft 104. In the illustrated embodiment, second surface 125 is configured to form a U-shaped frame that partially surrounds a portion of housing shaft 104. Second surface 125 is coupled to one or more second assembly attachment arms 127. Second assembly attachment arms 127 include a pivotable coupling point 142 that couples first assembly 130 to second assembly 132. For instance, pivotable coupling point 142 includes a pin that is inserted into a portion of second assembly attachment arm 127 to engage a portion of second assembly 132. Pivotable coupling point 142 thus couples first assembly 130 to second assembly 132 such that second assembly 132 is configured to rotate along the direction generally indicated by arrow 133.

Second assembly 132 illustratively includes a first plate 144, a second plate 146, a housing shaft engagement ring 148, one or more posts shown generally at reference numeral 150 (e.g., posts 150-1, 150-2, and 150-3), and one or more bearings shown generally at reference numeral 152 (e.g., 152-1, 152-2, and 152-3). In the illustrated embodiment, first plate 144 and second plate 146 include rectangular plates that have substantially the same dimensions in size. First plate 144 is secured to second plate 146 via an arrangement of four posts 150, each of which being positioned near a corner of first plate 144 and second plate 146. In one embodiment, posts 150 are threaded connections (e.g. a bolted connection) between first plate 144 and second plate 146. Thus, as similarly noted above with respect to first assembly 130, pivotable coupling point 142 couples first assembly 130 to first plate 144 of second assembly 132.

Housing shaft engagement ring 148 is illustratively positioned directly between first plate 144 and second plate 146. In one embodiment, housing shaft engagement ring 148 is configured to engage housing shaft 104. For instance, housing shaft engagement ring 148 couples to housing shaft 104 at a connection point shown generally at reference numeral 129. Connection point 129 can include any suitable connection mechanism. Illustratively, connection point 129 includes a threaded connection that configured to engage a screw within a portion of housing shaft engagement ring 148 and within a corresponding portion of housing shaft 104. Thus, housing shaft engagement ring 148 is illustratively configured to be secured to housing shaft 104 such that movement of housing shaft 104 is imparted to housing shaft engagement ring 148. FIG. 3 further illustratively shows that bearings 152 engage around posts 150. Bearings 152 are configured to engage a portion of housing shaft engagement ring 148. As such, housing shaft engagement ring 148 is configured to rotate along the direction generally indicated by arrow 135 by engaging bearings 152.

Thus, FIG. 3 illustratively shows that coupling mechanism 110 couples housing shaft 104, as it is secured to second assembly 132, to position guidance system 112 via first assembly 130. Coupling mechanism 110, in the illustrated example, configures housing shaft 104 (and thus arm 106 and attached cylindrical cutter 108) to be moveable along directions indicated by arrow 131, arrow 133, and arrow 135. As such, coupling mechanism 110 configures ground hole cutter 100 to be movable in at least three distinct directions when positioned relative a cutting location.

Briefly turning to FIG. 1-1, ground hole cutter 100 is in an upright position as indicated by reference numeral 137. FIG. 1-2 shows ground hole cutter 100 in a non-upright position as indicated by reference numeral 139. Non-upright position 139 of ground hole cutter 100 is achieved, in one example, by an operator pivoting ground hole cutter 100 along the direction indicated by arrow 131 (shown in FIG. 3) such that housing shaft 104 is movable from upright position 137 to non-upright position 139. In one embodiment, non-upright position 139 includes a transportation position that facilitates easy transportation of ground hole cutter 100. In one embodiment, upright position 137 includes an operating position that facilitates improved operation of ground hole cutter 100 in cutting and plugging a hole.

Figure 4:
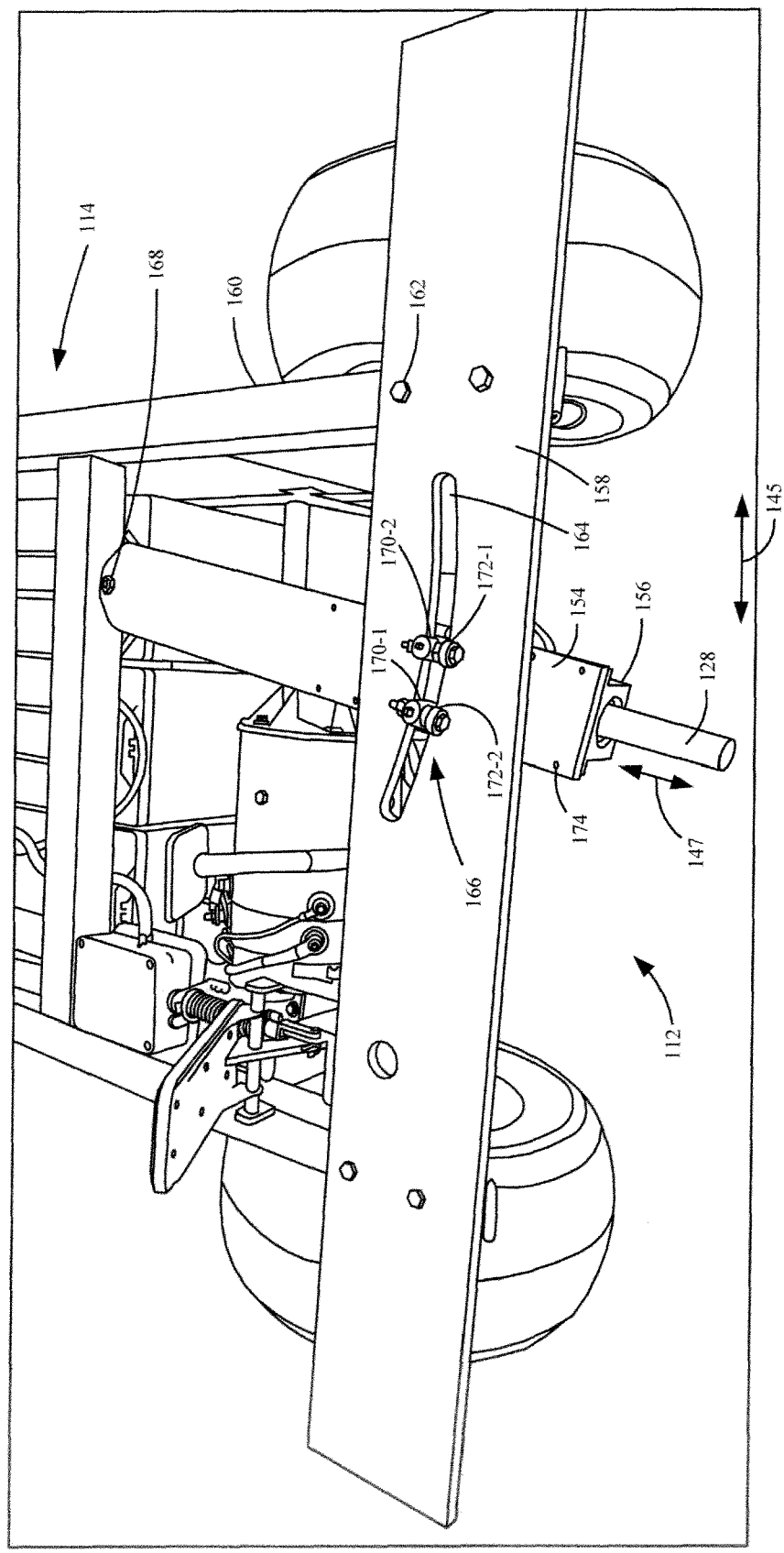
FIG. 4 illustratively shows a perspective view of a position guidance system of a ground hole cutter, in accordance with one embodiment.

FIG. 4 illustratively shows a perspective view of a position guidance system 112 of ground hole cutter 100, in accordance with one embodiment. Position guidance system 112 illustratively includes rod 128, a sway arm 154, a rod coupling sheath 156, a track platform 158, a supporting frame 160, a coupling point 162, a track 164, a roller bearing assembly 166 including one or more columns 170 (e.g. columns 170-1 and 170-2) and one or more roller bearings 172 (e.g., roller bearing 172-1 and roller bearing 172-2), a ball and socket joint 168, and a coupling point 174. Generally speaking, but not by limitation, rod 128 is configured to sway back and forth along the direction generally indicated by arrow 145. In addition, rod 128 is configured to extend and retract along the direction generally indicated by arrow 147. Thus, position guidance system 112 is configured to provide two additional dimensions of movement to ground hole cutter 100 (e.g., in addition to the three dimensions of movement provided by coupling mechanism 110, as discussed with respect to FIG. 3, above).

Supporting frame 160 can include any frame or mounting fixture that is configured to attach ground hole cutter 100 to transportation vehicle 114. In one embodiment, supporting frame 160 is a frame of transportation vehicle 114. For instance, supporting frame 160 is a standard frame for, for instance, a mowing vehicle that. In one embodiment, supporting frame 160 is a customized frame that is separate from, but attached to, a frame of transportation vehicle 114.

Ball and socket joint 168 is illustratively configured to be fixedly positioned on supporting frame 160. For instance, the socket portion of ball and socket joint 168 is projection welded or otherwise threadably connected to supporting frame 160. The ball portion of ball and socket joint 168 is fixedly positioned (e.g., projection welded, threaded with a bolted connection, etc.) on a portion of sway arm 154. As such, ball and socket joint 168 couples sway arm 154 to supporting frame 160 such that sway arm 154 engages the pivotable arrangement of ball and socket joint 168. Thus, sway arm 154 is pivotable relative to the fixed position of supporting frame 160. As will be discussed in further detail below, ball and socket joint 168 facilitates movement of ground hole cutter 100 in the direction indicated by arrow 145.

Sway arm 154 illustratively extends underneath and beyond track platform 158. Track platform 158 is coupled to supporting frame 160 via one or more coupling points 162. For instance, coupling point 162 comprises one or more (e.g. illustratively shown as four) bolted connections between track platform 158 and supporting frame 160.

Track 164 includes a portion of track platform 158 that is molded or otherwise formed within a surface of track platform 158. Track 164 provides a guided path for movement of sway arm 154, and thus provides a guided path for movement along the direction indicated by arrow 145 for positioning ground hole cutter 100. Illustratively, sway arm 154 is configured to sway in the direction indicated by arrow 145 by engaging track 164.

Columns 170, of roller bearing assembly 166, are coupled to sway arm 154. For instance, in one embodiment, columns 170 are projection welded (or otherwise attached) to a top surface of sway arm 154. Columns 170 each include a roller bearing 172 that is configured to engage track 164. For instance, roller bearings 172 roll along a top and/or bottom surface of track platform 158 according to the guided path of movement that is defined by track 164. As such, sway arm 154 is configured to sway along the direction indicated by arrow 145, confined to track 164, and with reduced friction due to the use of one or more roller bearings 172.

As noted above, sway arm 154 couples position guidance system 112 to ground hole cutter 100 with rod 128. Rod 128 includes a rod that is extendable and retractable relative to sway arm 154. Rod coupling sheath 156 is illustratively coupled to sway arm 154, particularly at a bottom surface of sway arm 154. Position guidance system 112 can include any number of rod coupling sheaths 156 that are positioned along a bottom surface of sway arm 154 (e.g., as illustratively shown with respect to rod sheath coupling 156 in FIG. 4). Rod coupling sheath 156 is configured to slidably engage rod 128 such that rod 128 can be slid into and out of rod coupling sheath 156 in the direction generally indicated by arrow 147.

Therefore, position guidance system 112 is configured to facilitate movement of ground hole cutter 100 in the direction indicated by arrow 145 with track 164 and roller bearing assembly 166 as illustratively coupled to sway arm 154. Position guidance system 112 is also therefore configured to facilitate movement of ground hole cutter 100 in the direction indicated by arrow 147 with rod 128 as illustratively being slidably coupled to sway arm 154 via rod coupling sheath(s) 156.

Figures 1, 5:
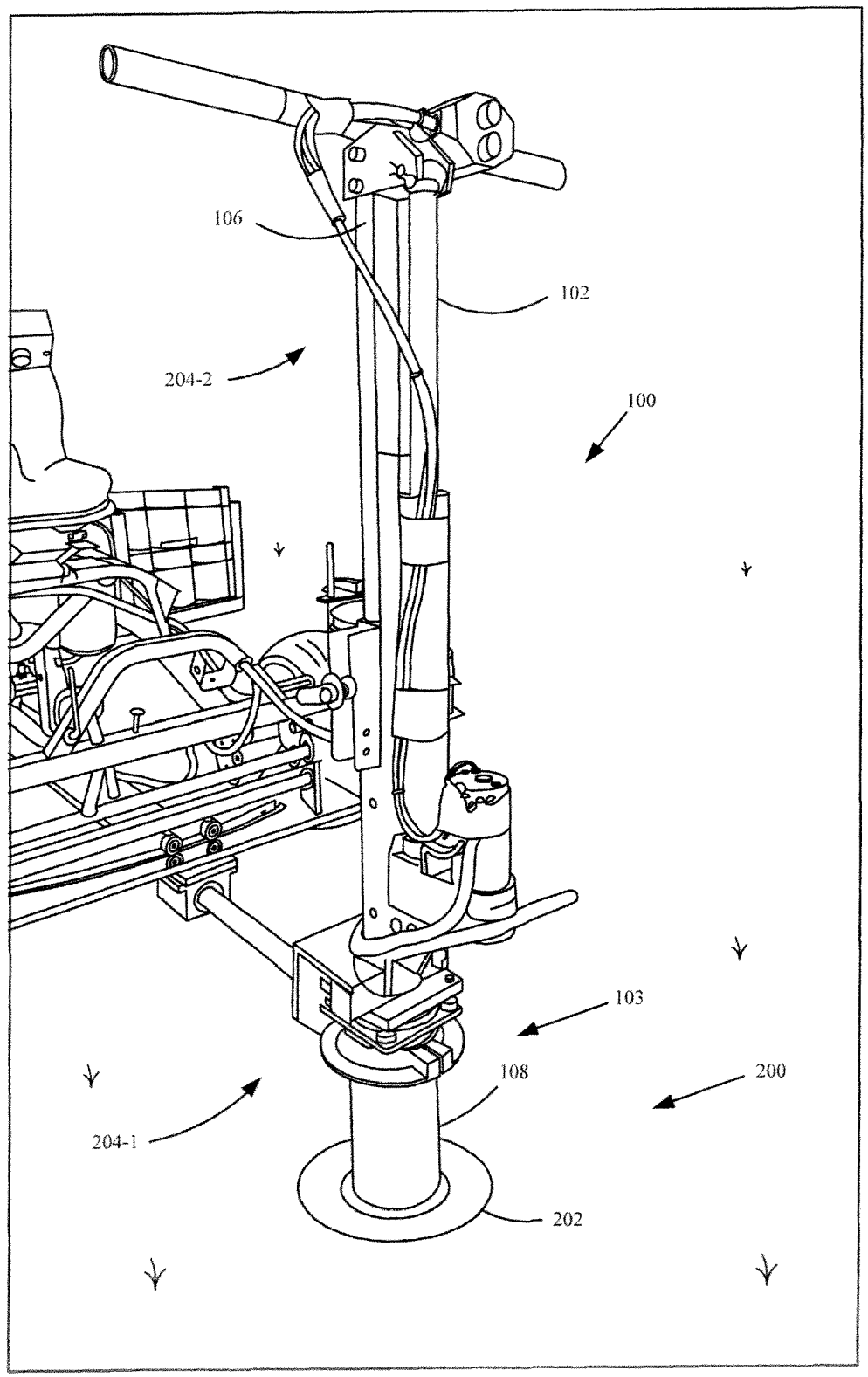
Figures 2, 5:
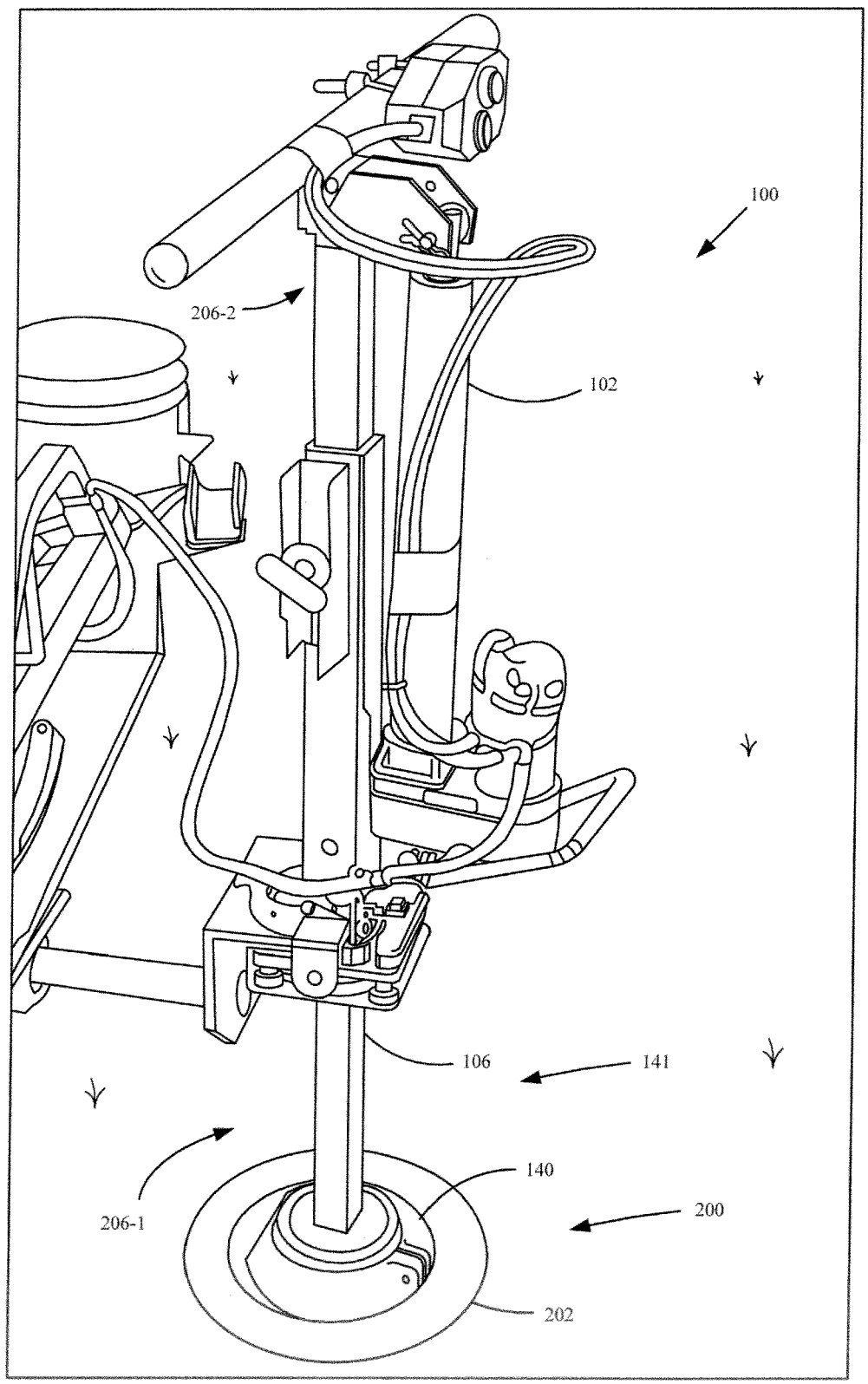
Figures 3, 5:
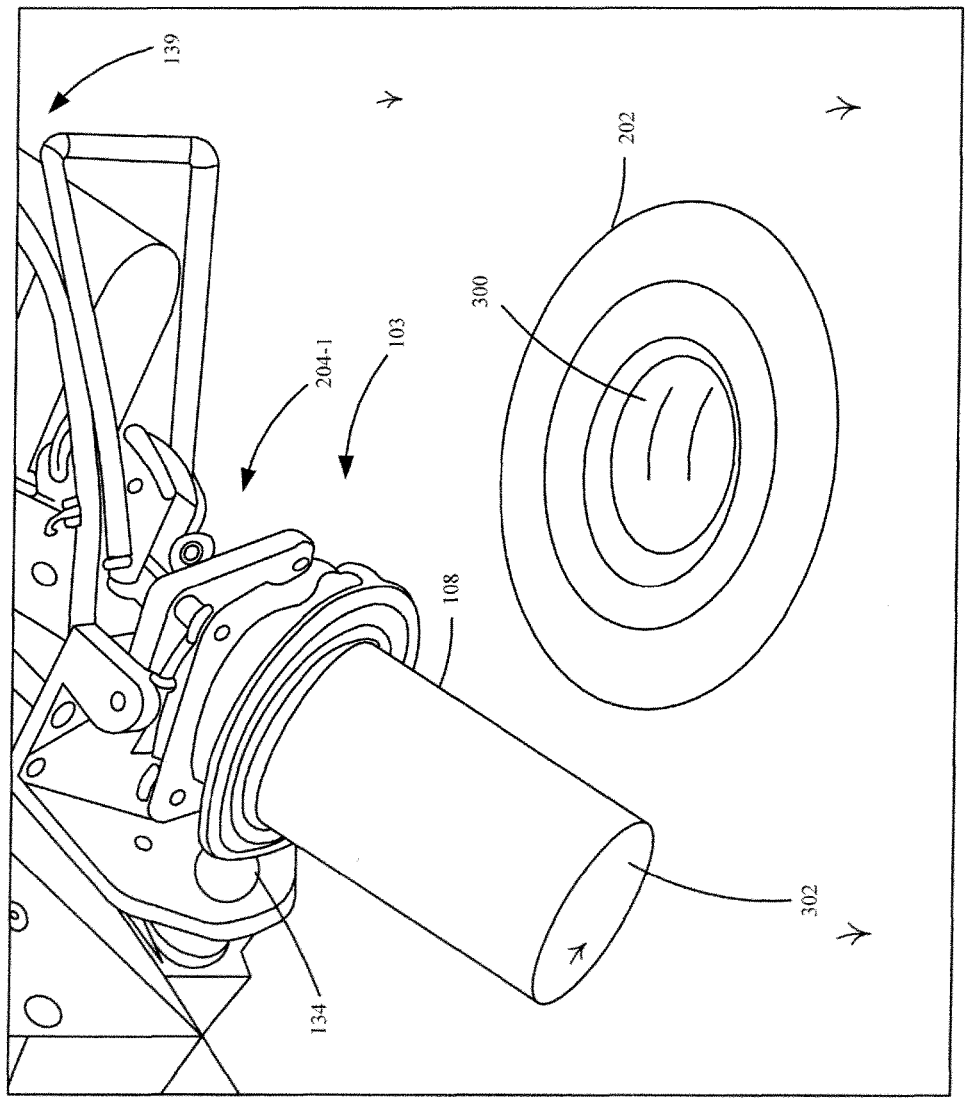
Figures 4, 5:
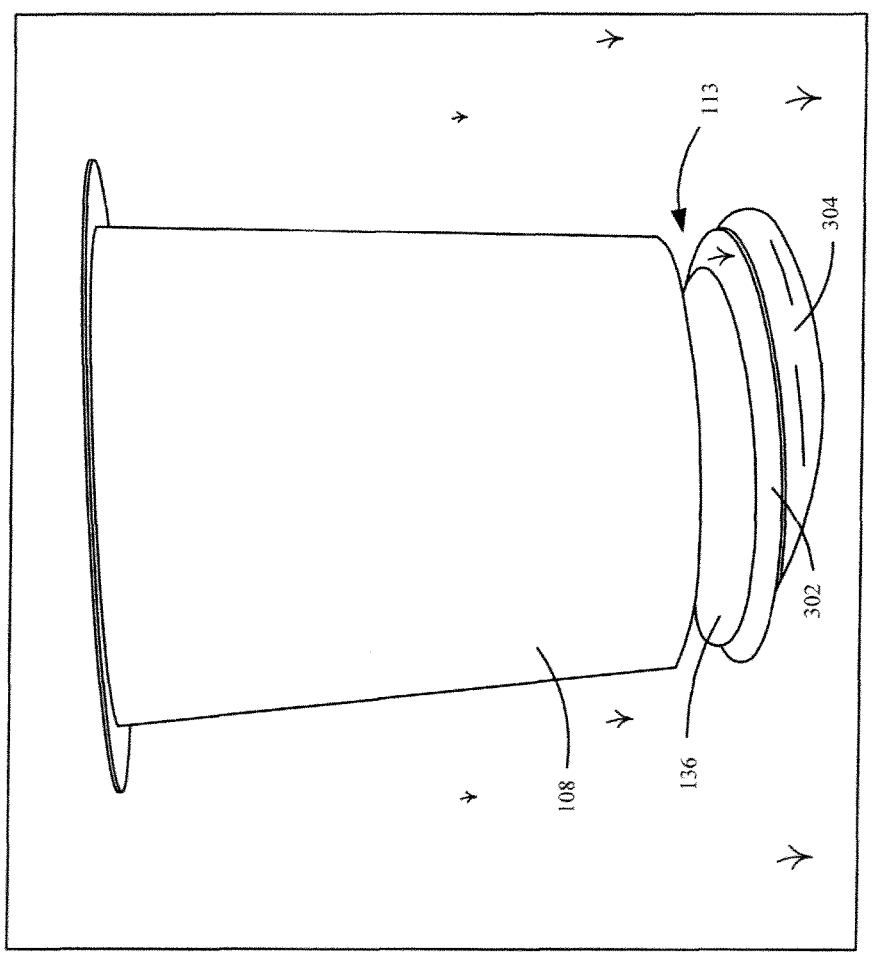

FIGS. 5-1 illustratively shows a perspective view of ground hole cutter 100 in a retracted position during operation to engage a ground surface in cutting a hole, in accordance with one embodiment. As shown in FIG. 5-1, ground hole cutter 100 is positioned above a ground surface position 200 where a hole is to be formed by cylindrical cutter 108. Not only can ground hole cutter 100 be transported to a relative location for forming a hole (e.g., via movement of transportation vehicle 114), the position of cylindrical cutter 108 can also be finely tuned by the use of position guidance system 112. Upon achieving the desired position of ground hole cutter 100, cylindrical cutter 108 is positioned directly above ground surface position 200, which is illustratively in-line with a stencil 202 of a hole to be formed. As shown in FIG. 5-1, ground hole cutter 100 is in a retracted position, as indicated by reference numeral 103. As similar discussed above with respect to FIG. 1-1, first position 103 includes a position in which arm 106 is fully retracted, as indicated by reference numeral 204-2. For instance, position 204-2 indicates that mechanical actuator 102 is extended, arm 106 is retracted past first opening 105 of housing shaft 104, and thus cylindrical cutter 108 is in a fully retracted position with respect to second opening 107.

FIG. 5-2 illustratively shows a perspective view of ground hole cutter 100 in an extended position during operation to engage a ground surface in cutting a hole, in accordance with one embodiment. As shown in FIG. 5-2, an operator has actuated control 122 to move mechanical actuator 102 to a fully retracted position. Thus, ground hole cutter 100 is illustratively in a fully extended position, as represented by reference numeral 141. Fully extended position 141 includes a position at which, response to retraction of mechanical actuator 102, arm 106 is fully retracted with respect to opening first 105 of housing shaft 104, as indicated by reference numeral 206-2. Thus, arm 106 is extended past second opening 107 of housing shaft 104, as indicated by reference numeral 206-1. At fully extended position 141, arm 106 extends cylindrical cutter 108 into the ground surface until hole depth flange 140 is flush with the top surface of stencil 202. Of course, cylindrical cutter 108 is configured to be extended to any depth suitable for forming a hole in a ground surface, and particularly for forming a hole in a green of a golf course. In one embodiment, the orientation of ground hole cutter 100, as shown in FIG. 5-2, is shown as being configured to engage a portion of ground and retain that portion of ground within cylindrical cutter 108.

FIG. 5-3 illustratively shows a perspective view of ground hole cutter 100 in a transportation position during operation to retain a plug of a formed hole, in accordance with one embodiment. FIG. 5-3 illustratively shows that ground hole cutter 100 is in first position 103 (retracted position), as indicated by reference numeral 204-1 (e.g., indicative of arm 106, and thus cylindrical cutter 108 being fully retracted). Thus, in an example where operation of cutting a hole is shown as progressing from FIG. 5-1 to 5-3, it is shown in FIG. 5-3 that cylindrical cutter 108 has been removed from being engaged within the ground surface position 200 of FIG. 5-2. Thus, FIG. 5-3 illustratively shows that ground hole cutter 100 has formed new hole 300. In addition, a ground plug from new hole 300 is retained within cylindrical cutter 108, as indicated at reference numeral 302. It is also illustratively shown that ground hole cutter 100 is in transportation position 139. For instance, coupling point 134 has been engaged to rotate ground hole cutter 100 to transportation position 139. Transportation position 139 is used in the illustrated embodiment to allow an operator to move ground hole cutter 100 to a new position, for instance to plug a previously formed hole with ground plug 302 retained in the cutter.

FIG. 5-4 illustratively shows a perspective view of ground hole cutter 100 in a plug ejection position during operation to plug a ground hole, in accordance with one embodiment. To cut additional holes with ground hole cutter 100, ground plug 302 needs to be removed from being retained within cylindrical cutter 108. In one embodiment, ground hole cutter 100 is configured to plug previously formed holes with ground plug 302. For instance, when an operator forms new hole 300, the operator may have a different (e.g., an older formed) hole that requires plugging. As such, FIG. 5-4 illustratively shows that cylindrical cutter 108 is positioned above a ground surface, and that plug actuator plate 136 is fully extended beyond opening 115 of cylindrical cutter 108 (e.g., as similarly shown and described with respect to FIG. 2-3). As mentioned above with respect to FIG. 2, for instance, plug actuator plate 136 is moved to position 113 in response to actuation of plug actuator 124. As such, ground plug 302 is fully ejected out of cylindrical cutter 108. Plug actuator plate 136 pushes ground plug 302 into a hole 300. Thus, hole 300 is illustratively which a plugged hole 304, is shown as being filled by ground plug 302. Thus, ground hole cutter 100 is not only configure to provide a power-assisted hole cutting device but also a power-assisted hole plugging device.

Figures 1, 6:
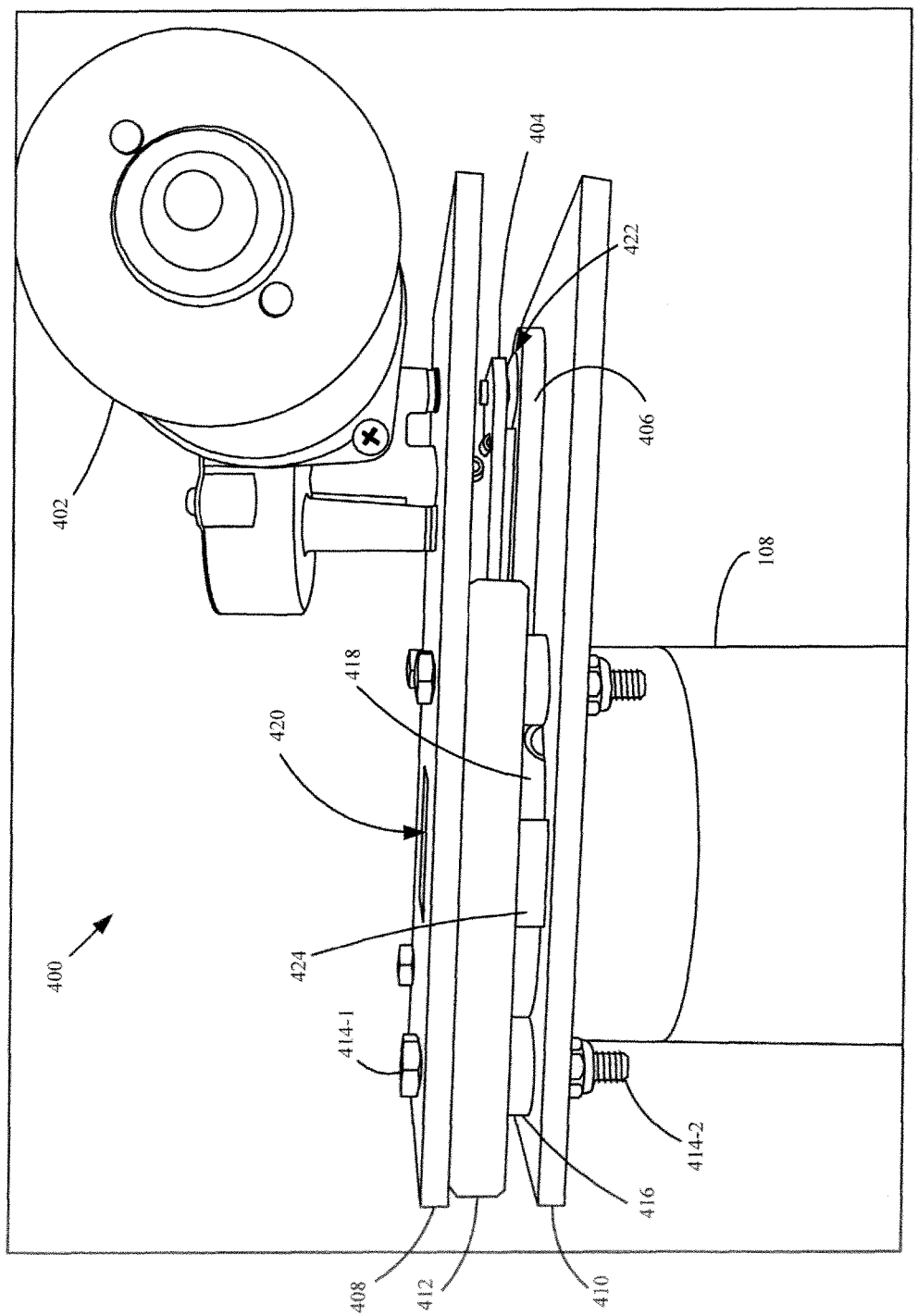
Figures 2, 6:
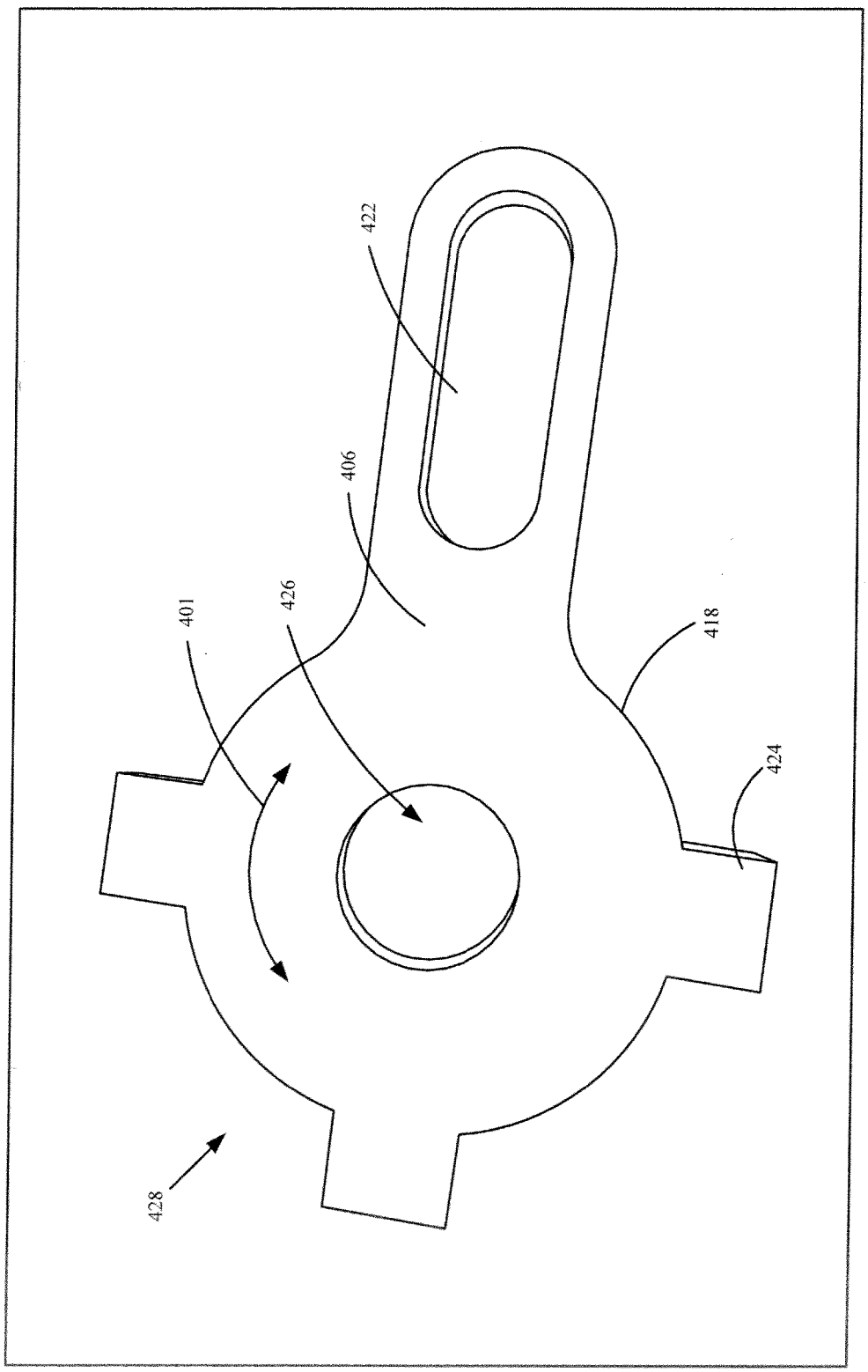

FIG. 6-1 shows a perspective view of a power-assisted cylindrical cutter 400, in accordance with one embodiment. Power-assisted cylindrical cutter 400 generally includes any of the features described with respect to cylindrical cutter 108. As shown in FIG. 6-1, power-assisted cylindrical cutter 400 operatively couples cylindrical cutter 108 to a motor source 402. Motor source 402 can be any of a wide variety of different power sources that powers movement of cylindrical cutter 108. In the illustrated example, motor source 402 is an electric motor, such as a direct current (DC) electric motor. In one embodiment, motor source 402 generates rotational motion and imparts said motion to cylindrical cutter 108. In the illustrated embodiment, motor source 402 is coupled to yoke mechanism 428.

Figure 7:
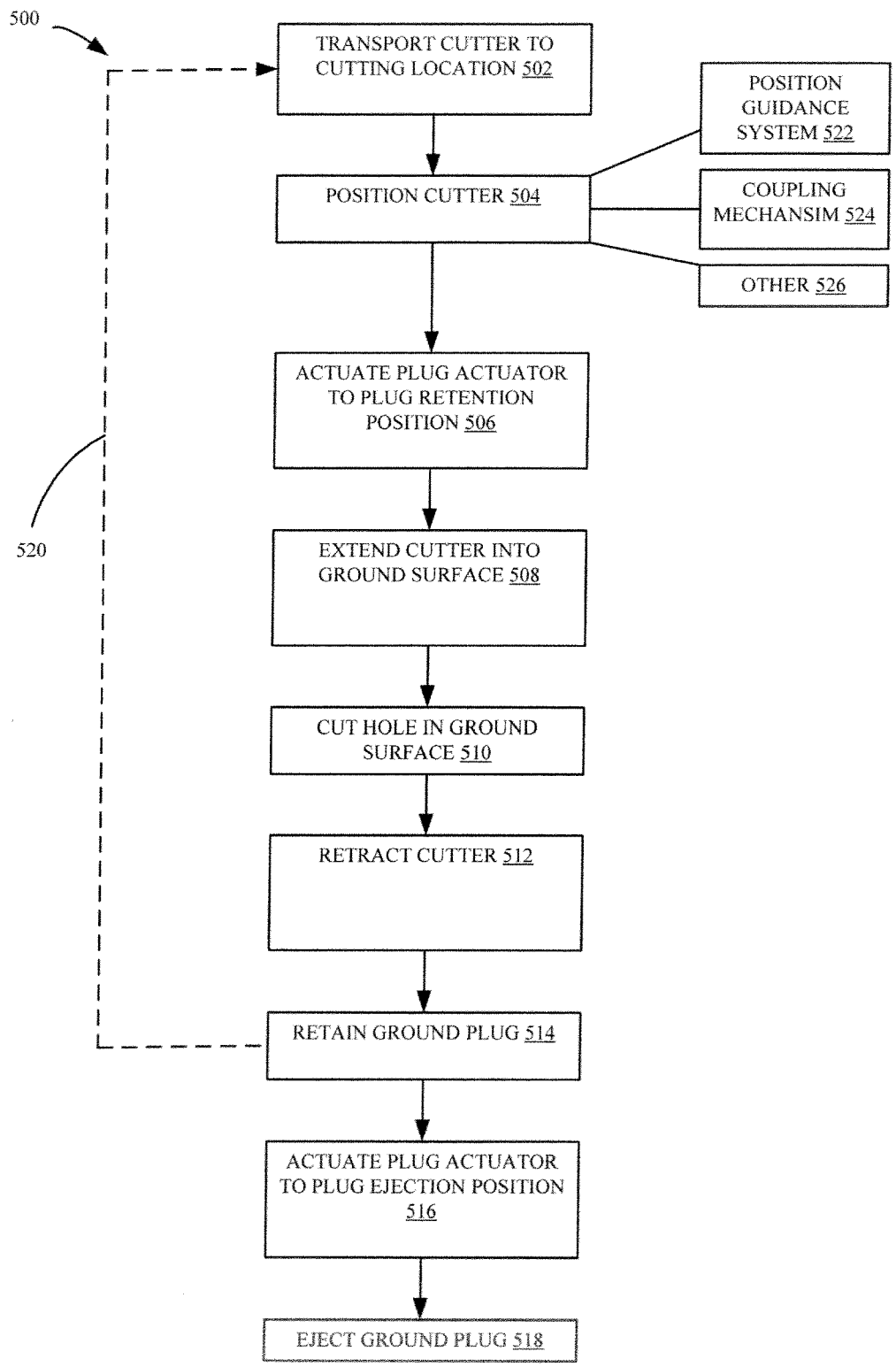
FIG. 7 illustratively shows a block diagram of a method of operating a ground hole cutter, in accordance with one embodiment.

FIG. 6-2 shows a perspective view of a yoke mechanism 428 configured for use with power-assisted cylindrical cutter 400, in accordance with one embodiment. FIGS. 7-1 and 7-2 (collectively referred to herein as FIG. 7) are discussed in further detail below.

Power-assisted cylindrical cutter 400 further includes a motor shaft 404, a top plate 408, a bottom plate 410, an interior plate 412, one or more bolted connections 414 (e.g., 414-1, 414-2, 414-3, and 414-4), one or more cylinder bearings 416 (e.g., 416-1, 416-2, 416-3, and 416-4), and a ground hole cutter engagement portion 420. Yoke mechanism 428 illustratively includes a yoke arm 406, a yoke body 418, a yoke coupling 422, a yoke notch 424, and a yoke to ground hole cutter engagement portion 426.

As an initial matter, ground hole cutter engagement portion 420 and corresponding yoke to ground hole cutter engagement portion 426 are configured to engage a portion of ground hole cutter 100, such as, but not limited to, housing shaft 104 and/or arm 106. In one embodiment, power-assisted cylindrical cutter 400 is configured to engage a portion of coupling mechanism 110, such as, but not limited to, first assembly 130 at one or more second assembly attachment arms 127. In one embodiment, ground hole cutter 100 can be modified by removing coupling mechanism 110 and replacing it with power-assisted cylindrical cutter 400. Thus, power-assisted cylindrical cutter 400 can also be configured to provide coupling between housing shaft 104 (and/or arm 106) and position guidance system 112 (and/or transportation vehicle 114).

Motor source 402 generates rotational motion and imparts said motion to motor shaft 404. Motor shaft 404 is configured to engage yoke coupling 422 and impart rotational motion to yoke mechanism 428. Yoke arm 406 illustratively extends between top plate 408 and bottom plate 410 such that yoke to ground hole cutter engagement portion 426 aligns with ground hole cutter engagement portion 420.

As similarly discussed above with respect to FIG. 3, bolted connections 414 are positioned near the corresponding corners of top plate 408 and bottom plate 410. Bolted connections 414 each engage a cylinder bearing 416 such that cylinder bearing 416 can rotate around bolted connection 414. Yoke body 418 is configured to slidably engage surfaces of cylinder bearings 416 at each of the corresponding bolted connections 414. Specifically, yoke body 418 includes an edge that engages cylinder bearings 416. As such, yoke mechanism 428 is configured to rotate back and forth along the direction generally indicated by reference numeral 401 by engaging a surface of yoke body 418 along cylinder bearings 416 and receiving imparted motion from motor source 402. For instance, yoke mechanism 428 rotates back and forth between positions in which yoke notch(s) 424 comes into contact with cylinder bearings 416.

In one embodiment, yoke mechanism 428 is coupled to cylindrical cutter 108. Of course, a wide variety of coupling mechanisms can be used to couple yoke mechanism 428 to cylindrical cutter 108. For instance, in one embodiment, but not by limitation, yoke mechanism 428 is welded to cylindrical cutter 108. Regardless of the type of connection being utilized, power-assisted cylindrical cutter 400 is configured to rotate (e.g. impart back and forth rotational motion to) cylindrical cutter 108. Such movement of cylindrical cutter 108 can further improve the ability of ground hole cutter 100 in forming a ground hole. In one embodiment, power-assisted cylindrical cutter 400 is configured to provide a wide variety of motion that is imparted to cylindrical cutter 108, such as, but not limited to, oscillation, vibration, circulation, etc.

FIG. 7 illustratively shows a block diagram of a method 500 of cutting a ground hole, in accordance with one embodiment. Method 500 can include any and/or all of the features described with respect to ground hole cutter 100. At block 502, method 500 illustratively includes transporting a ground hole cutter to a location for cutting. For instance, a ground hole cutter is coupled to a transportation vehicle that facilitates movement of the cutter to a location, such as a green on a golf course. At block 504, the method includes positioning the cutter. As illustrated in FIG. 5, at block 522, a position guidance system is used to position the cutter. At block 524, a coupling mechanism is used to position the cutter. The cutter can be positioned, for instance over a desired surface to cut a hole, using a variety of other mechanisms as indicated at block 526. In one embodiment, block 504 includes an operator actuating the various components of the cutter to move the cutter along various degrees of movement (e.g., at least 4 dimensions of movement available). Thus, block 504 includes fine tuning the position of the cutter to a specific location of a hole to be cut.

Once the cutter is in the desired position, an operator prepares the cutter to cut a hole. At block 506, method 500 includes actuating a plug actuator to a plug retention position. Block 506 can include actuating a plug actuator to move a plug actuator plate to a plug retention position. As such, the ground hole cutter is configured at block 506 to cut a hole and retain the cut material (the plug) within the an interior space such as that of a cylindrical cutter.

At block 508, method 500 illustratively includes extending the cutter into a ground surface. In one embodiment, block 508 includes actuating a mechanical actuator to extend the cutter into a ground surface. For instance, block 508 includes actuating a control to power a hydraulic actuator. The hydraulic actuator causes corresponding movement of the cutter, thereby allowing an operator to use a power-assisted mechanism for engaging the cutter into the ground surface.

At block 510, method 500 includes cutting a hole in a ground surface. For instance, an operator engages the cutter with the ground surface, which causes the ground surface to be cut around the cutter.

At block 512, method 500 illustratively includes retracting the cutter, for instance from being extended within the ground surface. In one embodiment, block 512 includes actuating the mechanical actuator to retract the cutter out of the ground surface. For instance, an operator actuates a control to send power to a hydraulic actuator and reverse the direction of extension caused by block 508. As such, block 512 includes an operator using a power-assisted cutter to remove the cutter from out of the ground surface at a location at which the hole was formed at step 510.

As discussed above, the cutter is configured to retain the ground plug within the cutter. This is especially true when block 506 is performed subsequent to block 510 and block 512. As such, the ground plug, which includes the ground surface material that was removed from location at which the hole was formed, is retained at block 514.

An operator may wish to dispose of the ground plug. In such a scenario, the operator may proceed with method 500 at block 516.

At block 516, an operator illustratively actuates the ground plug actuator to a plug ejection position. In one embodiment, block 516 includes actuating the actuator to move the plug actuator plate to a plug ejection position. For instance, the plug actuator plate is moved, via the plug actuator, through an interior space of a cutter to a position that causes the ground plug to be ejected out of the cutter.

At block 518, the ground plug is ejected from the cutter. Once this step is performed, the cutter is now available to perform further cutting of holes.

Referring back to block 514, if an operator instead wishes to dispose of the ground plug in a previously formed hole, the operator may return to block 502, as indicated by 520. For instance, an operator can retain the plug within the cutter, travel to a location of a previously formed hole, and perform a subset of the steps of method 500. For instance, 520 indicates that a user performs steps at blocks 504, 508, 516, and 518 to position the cutter at a previously formed hole, extend the cutter into that hole, and actuate the plug actuator to eject the plug into the hole, thereby plugging the hole.

Figure 8:
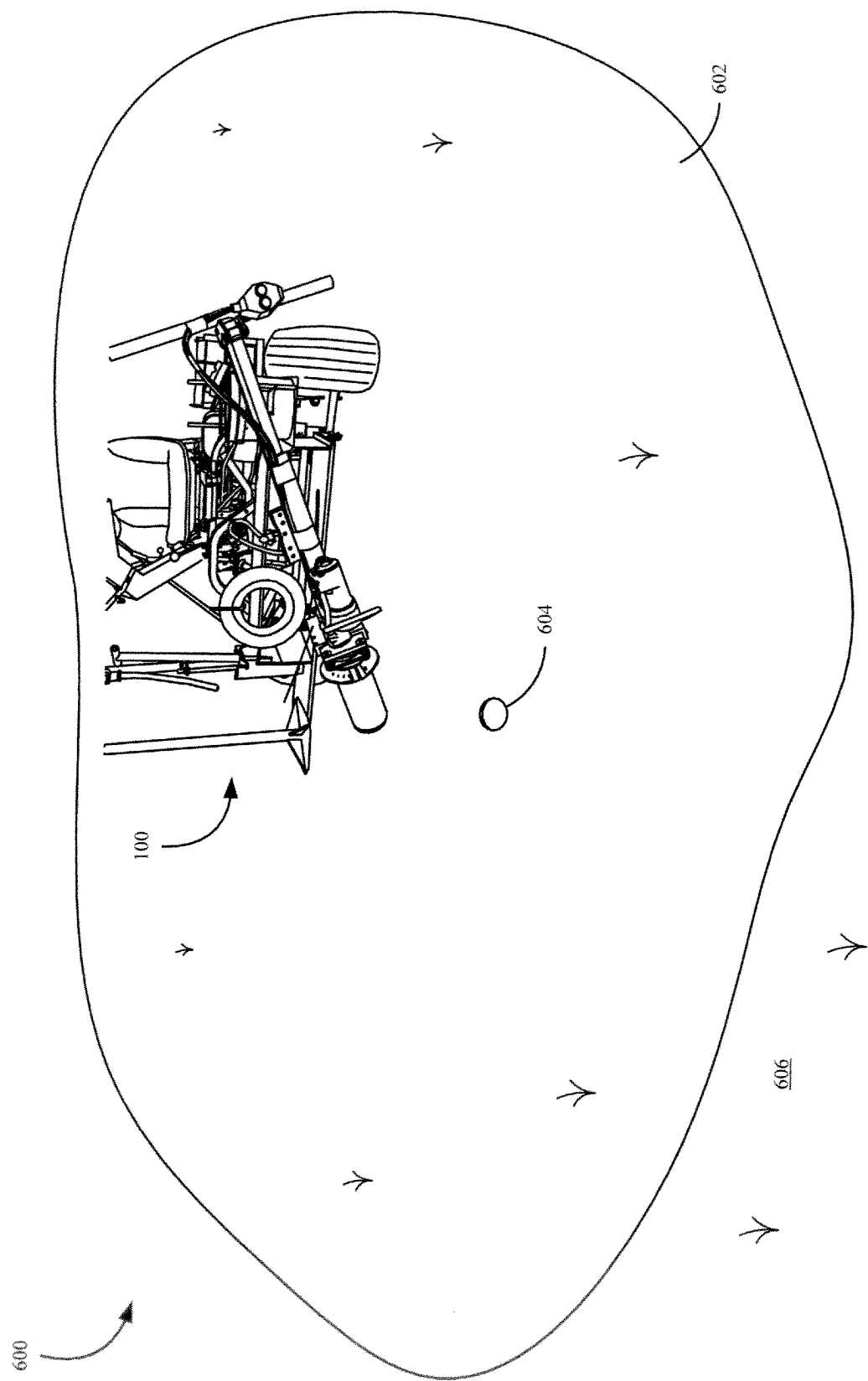
FIG. 8 illustratively shows a perspective view of a ground hole cutter in the context of a golf course, in accordance with one embodiment.

FIG. 8 illustratively shows a perspective view of a ground hole cutter 100 in the context of a golf course 600, in accordance with one embodiment. FIG. 8 illustratively shows that a golf course 600 includes a course surface 606 (e.g., a fairway or other portion of the course), a green 602, and a hole 604. In one embodiment, hole 604 is illustratively a hole that was cut by ground hole cutter 100. For instance, in the context of FIG. 6 and golf course 600, ground hole cutter 100 comprises a golf hole cutter that is power-assisted and configured to cut a hole in a green of a golf course.

Thus, provided herein is a ground hole cutter that is power-assisted and particularly useful in cutting holes in the context of the game of golf. The various features of the cutter allow the cutter to be easily transported to cutting locations, finely positioned at a hole to be formed, powered into and out of the ground surface, and able to retain a cut surface for use in plugging previous holes. These features reduce operator effort and time required to cut holes, and overall improves accuracy and efficiency of hole cutting, especially in the context of golf where attention to detail is paramount and creation of new holes and plugging of old holes is required to be done frequently.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A ground hole cutter comprising:
a mechanical actuator;
a housing shaft;
a position guidance system;
a coupling mechanism that couples the housing shaft to the position guidance system;
wherein the coupling mechanism comprises:
a first assembly including a pivotable coupling that couples to the position guidance system; and
a second assembly that engages the first assembly and the housing shaft;
an arm housed within the housing shaft and coupled to the mechanical actuator, wherein the arm is configured to extend and retract relative to the housing shaft;
a cylindrical cutter coupled to the arm and configured to engage a ground surface;
a power supply; and
a controller, coupled to the power supply, and configured to control extension and retraction of the arm by actuating the mechanical actuator such that the extension and retraction of the arm engages the cutting component to cut a hole in the ground surface.

2. The ground bole cutter of claim 1, wherein the second assembly comprises:
a first plate;
a second plate;
a housing shaft engagement ring positioned between the first plate and the second plate, wherein the housing shaft engagement ring is fixed relative the housing shaft; and
one or more bearings that engage the housing shaft engagement ring such that the housing shaft engagement ring is rotatable to rotate the housing shaft.

3. The ground hole cutter of claim 1, wherein the cylindrical cutter comprises a cylinder defined by standard golf hole dimensions.

4. The ground hole cutter of claim 1, further comprising:
a plug actuator plate;
a plug actuator connection rod coupled to the plug actuator connection plate; and
a plug actuator coupled to the plug actuator connection rod.

5. The ground hole cutter of claim 4, further comprising:
wherein the cylindrical cutter is configured to retain a ground plug; and
wherein actuation of the plug actuator ejects the ground plug out of the cylindrical cutter.

6. The ground hole cutter of claim 1, wherein the position guidance system comprises:
a track;
a sway arm; and
a bearing assembly coupled to the sway arm and configured to engage the track.

7. The ground hole cutter of claim 6, wherein the position guidance system comprises:
a rod; and
at least one rod coupling sheath, coupled to the sway arm, and configured to slidably engage the rod.

8. The ground hole cutter of claim 6, further comprising:
a supporting frame; and
a ball and socket bearing that pivotably couples the sway arm to the supporting frame.

9. The ground hole cutter of claim 1, wherein a retracted position of the mechanical actuator corresponds to an extended position of the cylindrical cutter.

10. The ground hole cutter of claim 1, and further comprising:
a transportation source; and
wherein the ground hole cutter is coupled to the transportation source and configured to be transported to a location of the hole to be formed.

11. The ground hole cutter of claim 1, further comprising:
a cylindrical cutter motor;
a yoke mechanism that couples the cylindrical cutter motor to the cylindrical cutter; and
wherein the yoke mechanism transfers rotational motion generated by the cylindrical cutter motor to the cylindrical cutter such that the cylindrical cutter is configured to oscillate.

12. The ground hole cutter of claim 1, wherein a bracket couples the arm to the mechanical actuator.

13. The ground hole cutter of claim 1, further comprising:
at least one handle configured to allow an operator to grip the ground hole cutter and facilitate movement of the ground hole cutter to a desired position.

14. The ground hole cutter of claim 1, wherein the mechanical actuator comprises hydraulics.

15. The ground hole cutter of claim 1, further comprising:
a transportation vehicle coupled to the ground hole cutter.

16. A power-assisted golf hole cutter comprising:
a power source;
a hydraulic actuator coupled to the power source and configured to extend and retract;
an arm coupled to the hydraulic actuator;
a cylindrical cutter coupled to the arm;
a position guidance system;
a coupling mechanism that couples the cylindrical cutter to the position guidance system;
wherein the position guidance system comprises:
a track;
a connector disposed beneath the track and configured to engage the coupling mechanism; and
at least one bearing assembly positioned on the connector and configured to engaged the track;
wherein retraction of the hydraulic actuator causes the arm and the cylindrical cutter to extend such that the cylindrical cutter engages a ground surface.

17. The power-assisted golf hole cutter of claim 16, wherein the golf hole cutter is coupled to a transportation vehicle.

18. The power-assisted golf hole cutter of claim 16, wherein the connector further comprises:
a sway arm;
a rod sheath coupled to the sway arm;
a rod configured to be movable within the rod sheath; and
wherein the rod is configured to be coupled to the coupling mechanism and is movable to change a position of the cylindrical cutter.

19. A ground hole cutter comprising:
a mechanical actuator;
a position guidance system, wherein the position guidance system comprises:
a track;

a sway arm;
a bearing assembly coupled to the sway arm and configured to engage the track;
a rod; and
at least one rod coupling sheath, coupled to the sway arm, and configured to slidably engage the rod;
a housing shaft;
a coupling mechanism that couples the housing shaft to the position guidance system;
an arm housed within the housing shaft and coupled to the mechanical actuator, wherein the arm is configured to extend and retract relative to the housing shaft;
a cylindrical cutter coupled to the arm and configured to engage a ground surface;
a power supply; and
a controller, coupled to the power supply, and configured to control extension and retraction of the arm by actuating the mechanical actuator such that the extension and retraction of the arm engages the cutting component to cut a hole in the ground surface.

20. The ground hole cutter of claim 19, wherein the ground hole cutter is actuatable between an operation position wherein the ground hole cutter is substantially vertical relative to the ground surface, and a transportation position wherein the ground hole cutter is substantially horizontal relative to the ground surface.

* * * * *